United States Patent [19]

Ichinose et al.

[11] Patent Number: 4,995,665
[45] Date of Patent: Feb. 26, 1991

[54] SUNROOF STRUCTURE FOR MOTOR VEHICLE

[75] Inventors: Hisao Ichinose, Atsugi; Yoshimitsu Takeda, Zama; Tsuyoshi Sato; Hiroshi Imai, both of Tokyo, all of Japan

[73] Assignees: Nissan Motor Company, Ltd.; Johnan Seisakusho Co., Ltd., both of Japan

[21] Appl. No.: 484,594

[22] Filed: Feb. 26, 1990

[30] Foreign Application Priority Data

Feb. 27, 1989 [JP] Japan ................................. 1-21587[U]
Feb. 27, 1989 [JP] Japan ................................. 1-21590[U]
Feb. 27, 1989 [JP] Japan ................................. 1-21588

[51] Int. Cl.$^5$ ............................. B60P 7/05; B60P 7/22
[52] U.S. Cl. .................................... 296/213; 296/217; 296/221; 296/216; 296/223
[58] Field of Search ........................ 296/213, 216–217, 296/221–223

[56] References Cited

U.S. PATENT DOCUMENTS 4,877,285 10/1989 Huyer ............................ 296/223 X

FOREIGN PATENT DOCUMENTS 58-32046 7/1983 Japan .
0209913 11/1984 Japan ............................ 296/221
61-125919 6/1986 Japan .
0036518 2/1989 Japan ............................ 296/221

OTHER PUBLICATIONS

Service Manual of Honda Legend, Honda Giken Co., Ltd., Nov. 1985.

Primary Examiner—Dennis H. Pedder
Attorney, Agent, or Firm—Lowe, Price, Leblanc, Becker & Shur

[57] ABSTRACT

A sliding/tilting sunroof structure whose overall height is kept relatively small by using an actuating linkage with sliding front and rear guides with a pivoting link extending from each guide to the sunroof panel. A rear portion of the front link is additionally guided by a front portion of the rear guide.

12 Claims, 5 Drawing Sheets

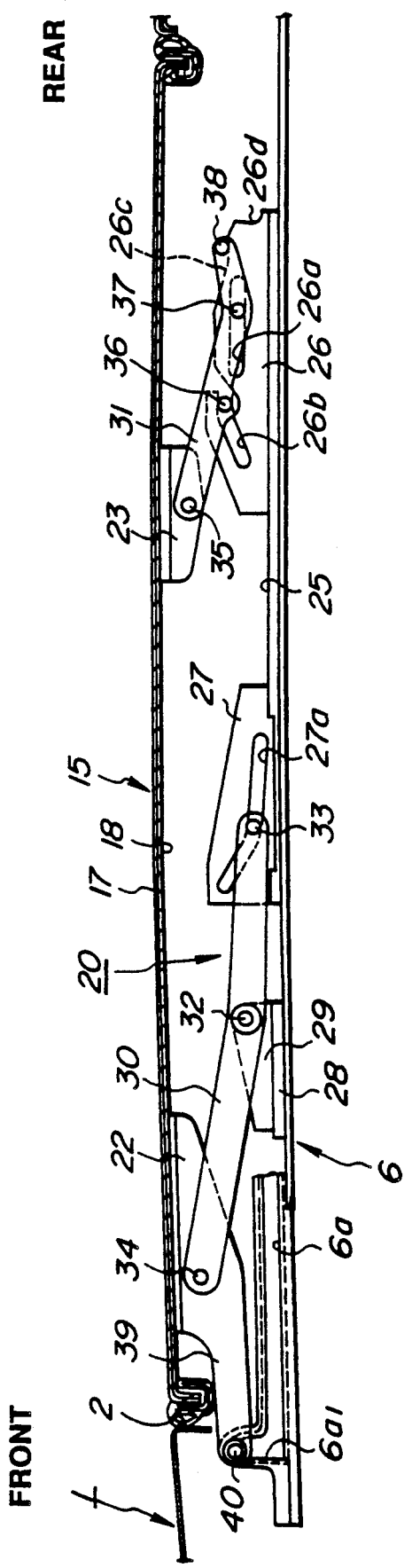

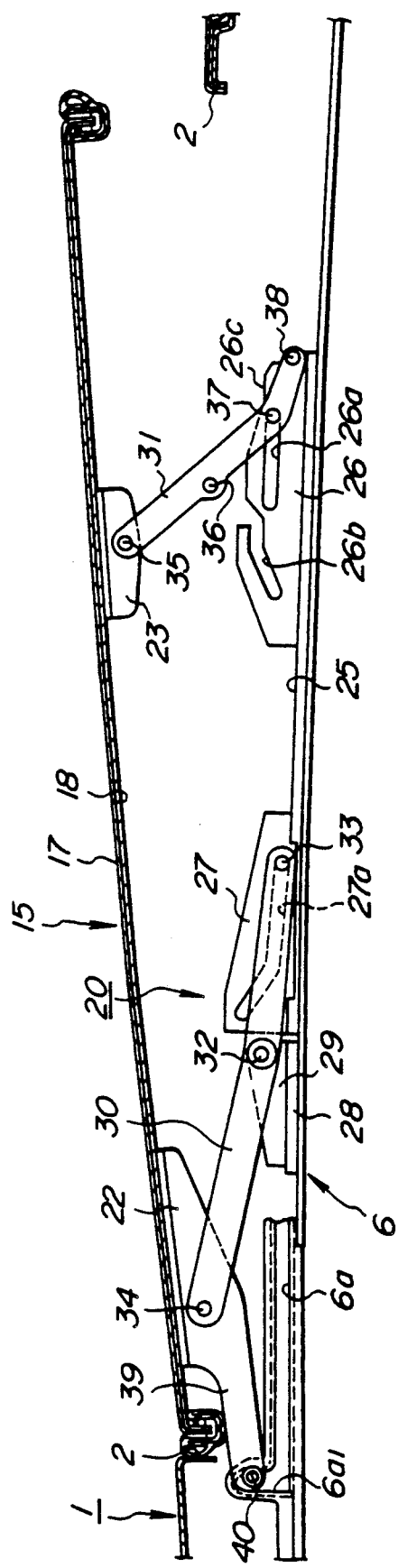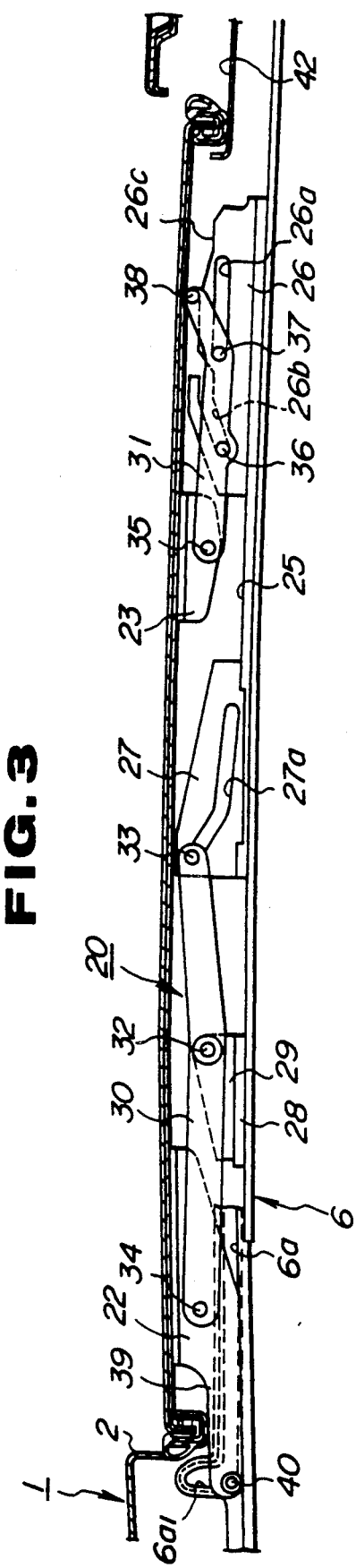

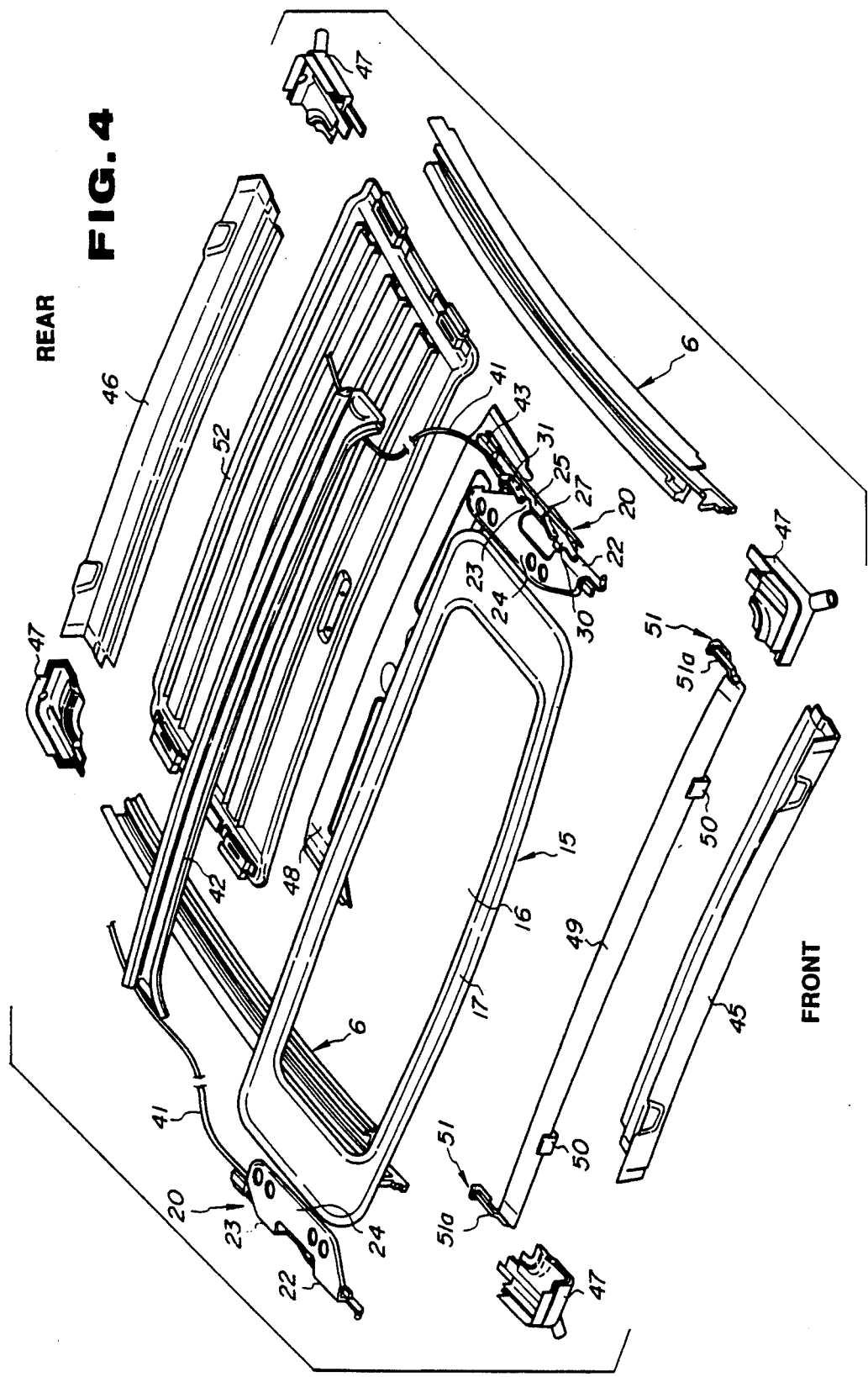

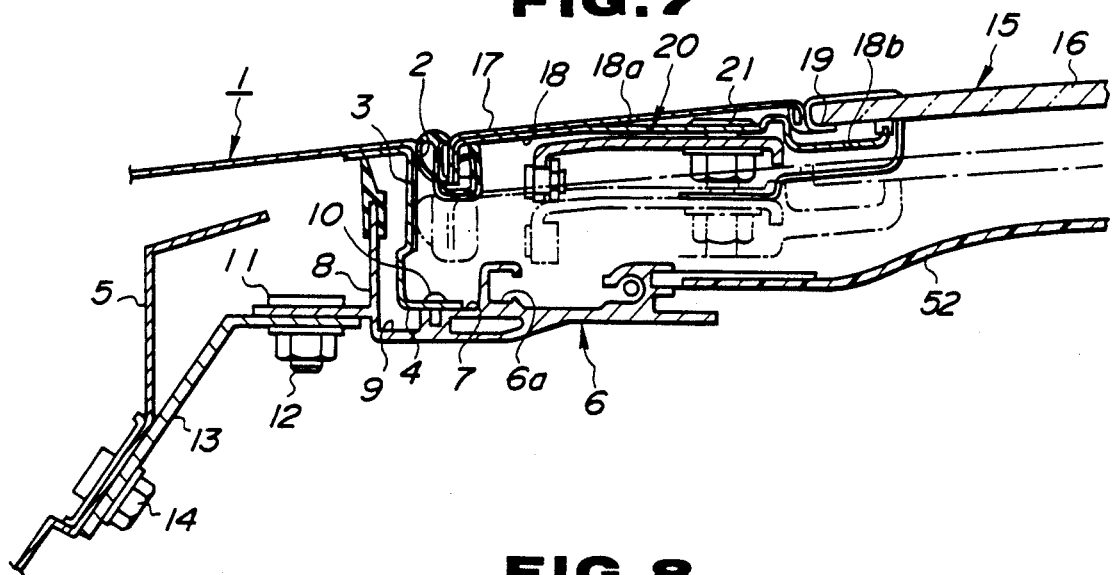
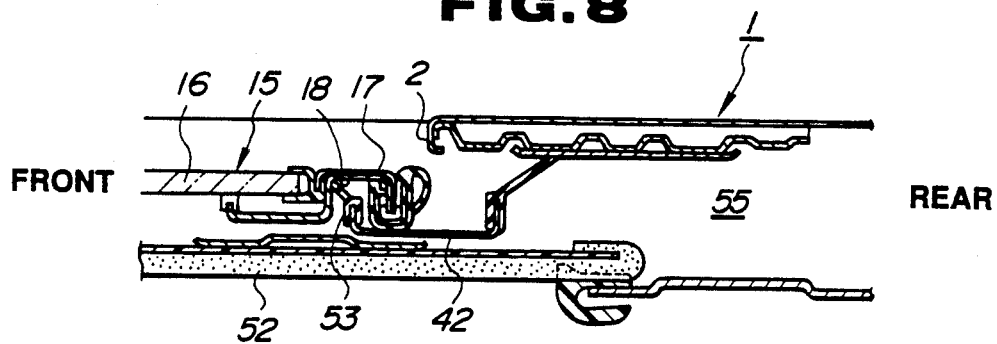
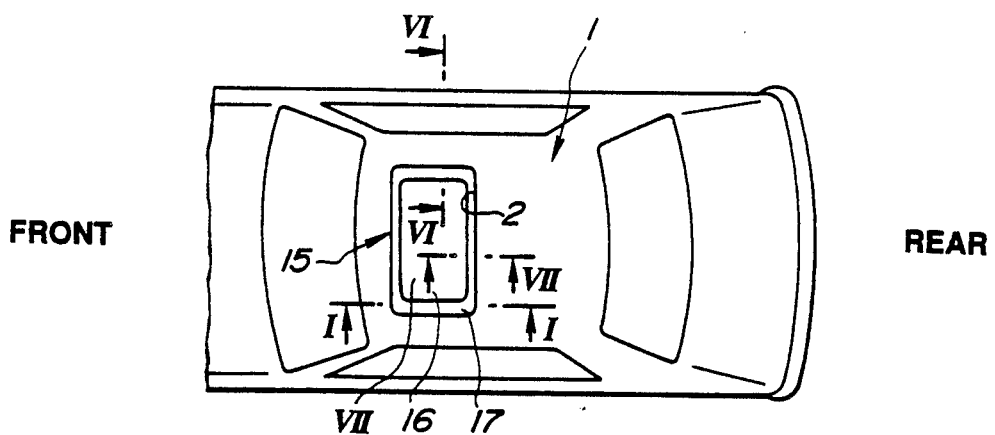

SUNROOF STRUCTURE FOR MOTOR VEHICLE

BACKGROUND OF THE INVENTION

1. Field of the Invention

The present invention relates in general to sunroof structures of a wheeled motor vehicle, and more particularly to the sunroof structures of a type which uses a transparent or semitransparent rigid plate as a lid for the sunroof aperture.

2. Description of the Prior Art

Hitherto, various types of sunroof structures have been proposed and put into practical use, particularly, in the field of wheeled motor vehicles. Some of them are disclosed in, for example, "SERVICE MANUAL" issued from HONDA GIKEN CO., LTD. in November 1985, Japanese Patent First Provisional Publication No. 61-125919 and Japanese Patent Second Provisional Publication No. 58-32046.

However, due to their inherent constructions, the sunroof structures disclosed in such publications fail to have a reduced thickness. As is known, when the thickness is marked, the clearance (viz., head clearance) defined between the sunroof lid and the head of the passenger is reduced causing the passenger to feel cramped in the passenger room.

In fact, in the sunroof structure shown in the SERVICE MANUAL of HONDA GIKEN CO., LTD., there is employed a tilt-up device for tilting up the sunroof lid from the closed position of the same. The tilt-up device generally comprises guided members which are slidably engaged with guide rails extending along respective sides of a rectangular sunroof aperture, and a link mechanism which extends between the guided members and mounts thereon the sunroof lid. However, due to the inherent structure of each guided member, the guided member has a considerable height, and thus, the thickness of the entire of the sunroof structure becomes marked.

In the sunroof structure of Japanese Patent First Provisional Publication No. 61-125919, there is employed a rainwater draining device which is designed to collect rainwater on a rear roof part when, with the sunroof lid kept tilted up, the vehicle is subjected to braking or deceleration. However, compactness of the rainwater draining device used in the sunroof structure is given little thought. This causes the considerable thickness of the sunroof structure.

In the sunroof structure of Japanese Patent Second Provisional Publication No. 58-32046, there is employed a lifting mechanism which functions to move down the sunroof lid before the lid is slided back into its hanger space located behind the sunroof aperture. However, also this lifting mechanism fails to have a reduced height, and thus, the thickness of the sunroof structure is marked.

SUMMARY OF THE INVENTION

It is therefore an object of the present invention to provide a sunroof structure for a motor vehicle, which is free of the above-mentioned conventional sunroof structures.

According to the present invention, there is provided a sunroof structure for a vehicle having an aperture formed in a roof of the vehicle. The sunroof structure comprises a guide rail extending along each side of the aperture; a sunroof lid adapted to cover the aperture; front and rear brackets secured to front and rear portions of the sunroof lid, the front bracket having a portion slidably engaged with the guide rail; a front guide slidably engaged with the guide rail; a rear guide device which is located behind the front guide and slidably engaged with the guide rail, the rear guide device including a front sub-guide and a rear guide which are united to move together; a front link having a front end pivotally connected to the front bracket and a middle portion pivotally connected to the front guide; a rear link having a front end pivotally connected to the rear bracket; first guide means for guiding the movement of a rear end of the front link with respect to the front sub-guide; second guide means for guiding the movement of a major portion of the rear link with respect to the rear guide; and drive means for driving the rear guide device along the guide rail.

BRIEF DESCRIPTION OF THE DRAWINGS

Other objects and advantages of the present invention will become apparent from the following description when taken in conjunction with the accompanying drawings, in which:

FIG. 1 is a vertically sectional view of a sunroof structure according to the present invention, showing a condition wherein a sunroof lid fully closes a sunroof aperture;

FIG. 2 is a view similar to FIG. 1, but showing a condition wherein the sunroof lid is in a tilt-up position;

FIG. 3 is a view similar to FIG. 1, but showing a condition wherein the sunroof lid is in a moved-down or sunken position;

FIG. 4 is an exploded view of the sunroof structure of the present invention;

FIG. 7 is an enlarged sectional view taken along the line VII—VII of FIG. 9;

FIG. 8 is an enlarged sectional view taken along the line VIII—VIII of FIG. 9; and FIG. 9 is a plan view of a motor vehicle to which the sunroof structure of the invention is practically applied.

DETAILED DESCRIPTION OF THE INVENTION

Figure 5:
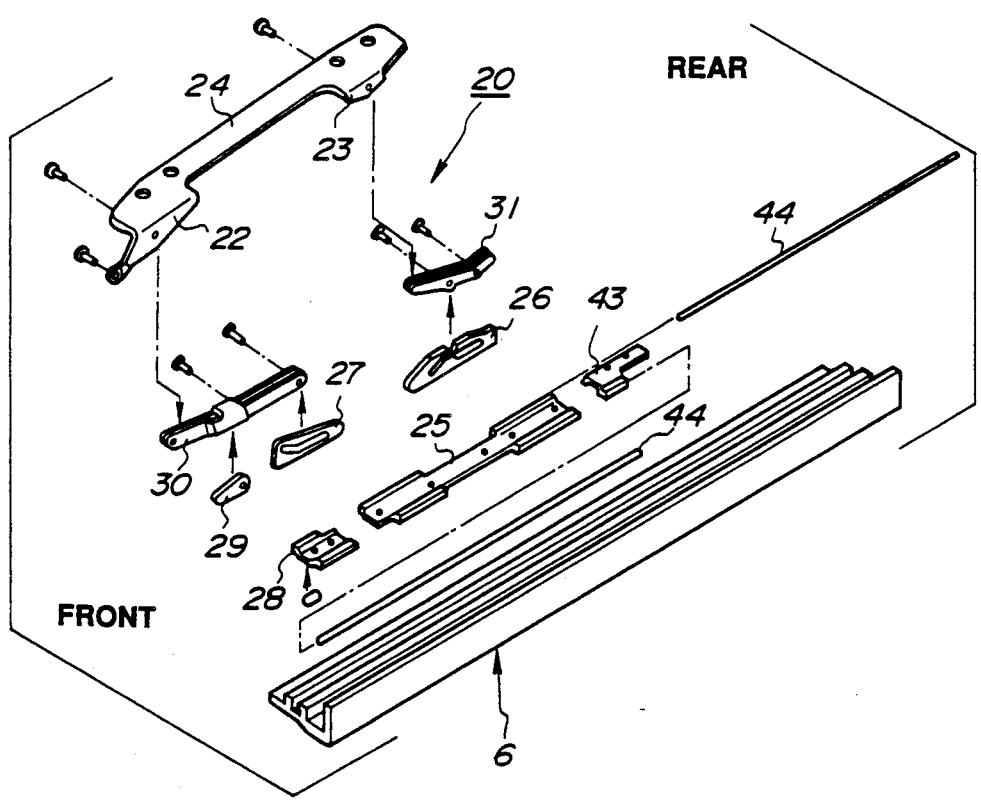
FIG. 5 is an exploded view of essential parts of the sunroof structure of the present invention.

In the following, the present invention will be described in detail with reference to the accompanying drawings. In the description, the terms, such as, front, rear, right, left, forward, rearward and the like are to be understood with respect to a motor vehicle on which the sunroof structure is mounted.

Referring to FIG. 9, there is shown a passenger motor vehicle to which the present invention is practically applied. As shown, the vehicle is formed at a roof 1 thereof with a rectangular aperture 2.

The sunroof structure of the present invention comprises generally a pair of (viz., left and right) guide mechanisms which are arranged at lateral sides of the aperture 2 and a sunroof lid 15 which is arranged on the paired guide mechanisms to slide between a full-close position and a full-open position, as will become clarified as the description proceeds.

Since the paired guide mechanisms are substantially the same in construction except for the orientation of the corresponding parts which constitute the respective mechanisms, the following description will be generally made with respect to one of the guide mechanisms, that is, the left guide mechanism.

As is seen from FIG. 7, an inward portion of the roof panel 1, by which each (viz., right) side of the aperture 2 is defined, is normally bent down. A reinforcing member 3 is secured to the bent-down portion, which has at its lower end a plurality of brackets 4.

It is to be noted that the brackets 4 are bent inwardly (that is, rightward as viewed in FIG. 7) in order to facilitate mounting of the roof panel 1 to a roof side rail 5. That is, when, during assembly of a white body of the vehicle, the roof panel 1 is moved down to the roof side rail 5, proper setting of the roof panel 1 relative to the roof side rail 5 is smoothly achieved without interruption of the brackets 4. This measure also induces enlargement in lateral size of the sunroof aperture 2 and thus enlargement of the head clearance in the passenger room.

A guide rail 6 is secured to the brackets 4. As shown in FIG. 7, the guide rail 6 comprises generally a seat portion 7, an upstanding wall portion 8 positioned outside the seat portion 7 and a horizontal flange portion 11 positioned outside the upstanding wall portion 8. As shown, upon assembly, the upstanding wall portion 8 is located outside the reinforcing member 3 and the seat portion 7 is secured to the brackets 4 by bolts 10. The upstanding wall portion 8 has thereon a weather strip (no numeral) which leads to an inner surface of the roof panel 1. Thus, an enclosed space 9 is defined between the reinforcing member 3 and the upstanding wall portion 8, which serves as a raindrop channel. It is to be noted that the raindrop channel 9 is not viewed from the outside due to provision of the upstanding wall portion 8 and the weather strip.

The horizontal wall portion 8 is secured to the roof side rail 5 through a bracket 13. For achieving this, a plurality of paired bolts and nuts 12 and 14 are used. Because of this arrangement, the load which the guide rail 6 can bear is increased.

As is seen from FIGS. 4 and 7, the sunroof lid 15 used in the invention comprises a rectangular center panel 16 which may be transparent or semitransparent, and a rectangular metal frame 17 which hems the center panel 16.

As is seen from FIG. 7, the metal frame 17 has an inner panel 18 attached thereto. The inner panel 18 includes a horizontal portion 18a which faces toward the guide rail 6 and an overhang portion 18b which projects inwardly beyond an inner edge of the metal frame 17. The overhang portion 18b has a raised leading end equipped with a sealing strip which is resiliently pressed against an inner surface of the center panel 16. As shown, the inner edge of the metal frame 17 is bent downward and snugly engaged with a retainer 19 which extends along and is secured to an outer edge of the center panel 16. With this, the metal frame 17 and the center panel 16 are tightly combined to constitute the sunroof lid assembly 15.

A drive link mechanism 20 is installed in a space which is defined below each side of the metal frame 17. It is to be noted that the effective usage of the space for mounting therein the link mechanism 20 brings about a reduction in the distance between the metal frame 17 and the guide rail 6, that is, a reduction in thickness of the sunroof structure.

As is seen from FIGS. 1, 5 and 7, the drive link mechanism 20 is carried by front and rear brackets 22 and 23 of a bridge member 24 which is secured through bolts 21 and nuts to the horizontal portion 18a of the inner panel 18.

The drive link mechanism 20 comprises generally a rear guide 26 and a front sub-guide 27 which are secured to a rear guide shoe 25 which is slidably engaged with the guide rail 6, a front guide 29 which is secured to a front guide shoe 28 which is slidably engaged with the guide rail 6 in front of the rear guide shoe 25, a front link 30 and a rear link 31.

As is seen from FIG. 1, the front link 30 is somewhat bent at its middle portion and is pivotally connected at its front end to the front bracket 22 through a pin 34. The front link 30 has the middle portion pivotally connected through a pin 32 to the front guide 29. The front link 30 further has at its rear end a guide pin 33 which is slidably engaged with a bent slit 27a formed in the front sub-guide 27. As shown, the bent slit 27a comprises a largely inclined front part and a slightly inclined rear part.

The rear link 31 is pivotally connected at its front end to the rear bracket 23 through a pin 35. A rear portion of the rear link 31 has a guide pin 37 slidably engaged with a horizontal slit 26a formed in the rear guide 26. The rear link 31 has further two guide pin 36 and 38 before and after the guide pin 37. The guide pin 36 is slidably engaged with a cam groove 26b formed in the rear guide 26 and the other guide pin 38 is slidably engaged with a cam surface 26c formed on a rear upper portion of the rear guide 26. As shown, the cam groove 26b comprises an inclined front part and a horizontal rear small part.

The front bracket 22 has an arm portion 39 which extends forward and has at the front end a guide pin 40 which is slidably engaged with a guide groove 6a (see FIG. 6) of the guide rail 6. It is to be noted that the guide groove 6a is defined by and extends along the guide rail 6.

As is seen from FIG. 1, the guide groove 6a has at its front end an upwardly extending portion $6a_1$. As will become apparent as the description proceeds, the tilting-up operation of the sunroof lid 15 is carried out having the guide pin 40 pivotally received in the upward portion $6a_1$.

Figure 6:
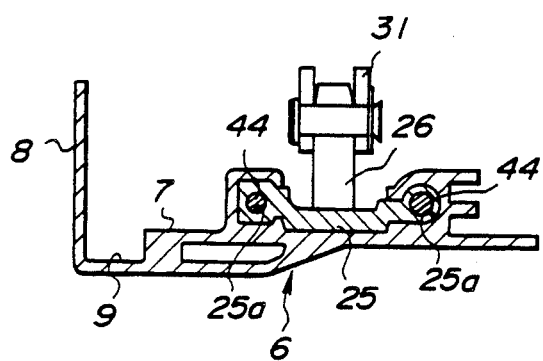
FIG. 6 is an enlarged sectional view taken along the line VI—VI of FIG. 5.

As will be understood from FIGS. 4, 5 and 6, behind the rear guide shoe 25, there is arranged another shoe 43 which carries one end of a rear drain member 42 along the guide rail 6. As is seen from FIGS. 5 and 6, the shoe 43 is connected to the front guide shoe 28 through two connecting rods 44 which slidably pass through respective guide bores 25a and 25a formed in lateral side portions of the rear guide shoe 25. Thus, the front guide 29 and the rear drain member 42 move together like a unit along the guide rail 6.

As is seen from FIG. 4, one end of a geared wire 41 is fixed to the rear guide shoe 25, which wire 41 extends rearward therefrom and turns inside at one rear corner of the rectangular aperture 2 of the roof 1.

Although not shown in the drawings, there is arranged an electric drive unit at a rear center portion of the rectangular aperture 2, by which the geared wire 41 is driven. Thus, in response to a movement of the geared wire 41, the rear guide 26 and the front subguide 27 move forward or rearward like a unit.

The electric drive unit comprises generally an electric motor, a speed reduction gear connected to the motor and a pinion connected to an output shaft of the speed reduction gear. It is to be noted that both the left and right geared wires 41 are meshed with the pinion at diametrically opposed portions of the same, so that rotation of the pinion in one or the other direction moves the major parts of both the wires 41 in the same direction.

As is shown in FIG. 4, front and rear traversers 45 and 46 are disposed between the left and right guide rails 6 and 6 with an interposal of respective corner pieces 47 therebetween. With this, the structure of the guide rails 6 is reinforced. Each corner piece 47 has a drain tube (no numeral) connected thereto. Designated by numeral 48 is an auxiliary traverser which is positioned near the rear traverser 46.

A deflector 49 is arranged on the front traverser 45. That is, the deflector 49 is pivotally connected to the front traverser 45 through two hinge members 50 and 50. Each longitudinal end of the deflector 49 has a link mechanism 51 associated therewith. The link mechanism 51 comprises a base (no numeral) secured to the front end of the guide rail 6 and a pivotal link 51a pivotally connected to the end of the deflector 49. That is, when, upon full closing of the sunroof lid 15, the front end of the lid 15 abuts against the link 51a, the deflector 49 is pivoted down to assume a flat rest position, while, when, upon starting of the opening movement of the sunroof lid 15, the front end of the lid 15 is disengaged from the link 51a, the deflector 49 is pivoted upward to assume an inclined operative position.

Designated by numeral 52 in FIG. 4 is a rectangular shade member which is slidable forward and rearward at a position below the sunroof lid 15 independently of the same. That is, as is seen from 7, the shade member 52 has lateral sides each slidably engaged with a guide groove (no numeral) formed in the guide rail 6.

In the following, operation of the sunroof structure of the present invention will be described with reference to the drawings.

For ease of understanding, the description will be commenced with respect to a fully closed condition of the sunroof structure wherein the sunroof aperture 2 is fully closed by the sunroof lid 15, as is shown in FIG. 1.

Under this closed condition, as is shown in FIG. 1, the guide pin 40 of the front bracket 22 is stably received in the upward front portion 6a₁ of the guide groove 6a, the guide pin 33 of the front link 30 is located at a generally middle part of the bent slit 27a of the front sub-guide 27, and the three guide pins 36, 37 and 38 of the rear link 31 assume the respective positions as shown in the drawing. It is to be noted that even under this fully closed condition, the shade member 52 is freely movable between its front position just below the closed sunroof lid 15 and its rear position below a hanger space 55 (see FIG. 8) for the sunroof lid 15.

When, due to energization of the electric motor, the geared cable 41 is somewhat moved forward, the rear guide shoe 25 is moved forward along the guide rail 6 and the connecting rods 44. This forward movement causes not only movement of the guide pin 33 of the front link 30 toward the rear end of the guide slit 27a but also movement of the guide pins 36, 37 and 38 of the rear link 31 toward the rear ends of their associated cam groove 26b, horizontal guide slit 26a and cam surface 26c. Because of the inclination with which the rear part of the guide slit 27a is arranged, the movement of the guide pin 33 in the slit 27a causes a clockwise pivoting of the front link 30 about the pin 32, as viewed in FIG. 1. Thus, the sunroof lid 15 is gradually raised or pivoted counterclockwisely about the guide pin 40. When, due to continuous operation of the electric motor, the rear guide shoe 25 comes to a given position, the guide pin 33 abuts against the rear end of the guide slit 27a and the guide pin 38 comes into abutment with a lower step part 26d of the rear guide 26, getting off the cam surface 26c, causing the sunroof lid 15 to assume its tilt-up position as shown in FIG. 2. Upon this, the electric motor is deenergized.

Under this tilt-up condition, the guide pin 36 of the rear link 31 is disengaged from the cam groove 26b and the guide pin 37 abuts against the rear end of the horizontal slit 26a, as shown. Furthermore, under this condition, the rear guide shoe 25 is kept unmovable because of the braking effect produced by the output pinion of the speed reduction gear of the electric drive unit.

When, for achieving the full close position of the sunroof lid 15, the geared cable 41 is somewhat moved rearward by operating the motor in a reversed direction, the rear guide shoe 25 is moved somewhat rearward causing the above-mentioned parts to carry out reversed movements. Thus, upon deenergization of the electric motor, the fully closed condition of the sunroof structure as shown in FIG. 1 is reestablished.

When now, due to energization of the electric motor, the geared cable 41 is moved rearward, the rear guide shoe 25 is moved rearward along the guide rail 6 and the connecting rods 44. During this movement, the guide pin 33 of the front link 30 is moved toward a front end of the largely inclined part of the guide slit 27a and the guide pins 36, 37 and 38 are moved toward the front portions of their associated cam groove 26b, horizontal guide slit 26a and cam surface 26c. Due to the unique configurations of the guide slit 27a and the cam groove 26b, the movement of the guide pins 33 and 36 in and along them causes the sunroof lid 15 to move down as shown in FIG. 3.

Under this moved-down condition, the guide pin 40 of the front bracket 22 is disengaged from the upward portion 6a₁ of the guide groove 6a and, as is seen from FIG. 8, a rear flange portion of the rectangular metal frame 17 of the sunroof lid 15 is put into the rear drain member 42. As shown in this drawing, the rear drain member 42 has a first weather strip 53 secured thereto and the rear flange portion of the rectangular metal frame 17 is equipped with a second weather strip 54. Because of provision of the two weather strips 53 and 54, watertight sealing between sunroof lid 15 and the rear drain member 42 is assured.

When, due to continuous operation of the electric motor, the geared cable 41 is further moved rearward, the sunroof lid 15, the front guide 29 and the rear drain member 42 are moved rearward together with the rear guide shoe 25 into the hanger space 55. When the sunroof lid 15 is fully received in the hanger space 55, the electric motor is deenergized. Upon this, the sunroof aperture 2 is fully opened and thus the full open condition of the sunroof structure is established.

When closing of the sunroof apertuer 2 is required, the reversed operation is carried out.

In the following, advantages of the present invention will be described.

Since, before getting into the hanger space 55, the sunroof lid 15 is entirely sunken to the moved-down position while reducing the thickness of the entire construction of the sunroof lid assembly, the height or thickness of the sunroof structure is very reduced as compared with the afore-mentioned conventional sunroof structures. In fact, the front offset arrangement defined by the front bracket 22, the front guide 29 and the front sub-guide 27 which are pivotally connected by the front link 30 and the rear offset arrangement defined by the rear bracket 23 and the rear guide 26 which are pivotally connected by the rear link 31 cause the reduction in thickness of the sunroof structure.

Second, since the space defined below the rectangular metal frame 17 is effectively used for mounting therein the drive link mechanism 20, the thickness of the sunroof structure is reduced by a degree corresponding to the part of the link mechanism 20 which is practically exposed to the space.

Third, since the connecting rods 44 for connecting the front guide shoe 28 and the rear drain member shoe 43 are slidably passed through the guide bores 25a and 25a of the rear guide shoe 25, the simultaneous movement of the front guide shoe 28 and the rear drain member shoe 43 is assuredly achieved without flexion of the rods 44. Since the rods 44 are received in the guide bores 25a, the same are not viewed from the outside. This improves an external appearance of the sunroof structure.

Fourth, since the cam groove 26b, the horizontal slit 26a and the cam surface 26c are offset in the rear guide 26 in the manner as has been described hereinabove, the height of the rear guide 26 can be reduced to a sufficiently small degree. This induces also the reduction in thickness of the sunroof structure.

What is claimed is:

1. A sunroof structure for a vehicle having an aperture formed in a roof of the vehicle, said sunroof structure comprising:
   a guide rail extending along each side of said aperture;
   a sunroof lid adapted to cover said aperture;
   front and rear brackets secured to front and rear portions of said sunroof lid, said front bracket having a portion slidably engaged with said guide rail;
   a front guide slidably engaged with said guide rail;
   a rear guide device which is located behind said front guide and slidably engaged with said guide rail, said rear guide device including a front sub-guide and a rear guide which are united to move together;
   a front link having a front end pivotally connected to said front bracket and a middle portion pivotally connected to said front guide;
   a rear link having a front end pivotally connected to said rear bracket;
   first guide means on said front sub-guide for guiding a movement of a rear end of said front link with respect to said front sub-guide;
   second guide means on said rear guide for guiding a movement of a major portion of said rear link with respect to said rear guide; and
   drive means for driving said rear guide device along said guide rail.

2. A sunroof structure as claimed in claim 1, in which said guide rail has a longitudinally extending guide groove with which a guide pin secured to said front bracket is slidably engaged.

3. A sunroof structure as claimed in claim 2, in which said guide groove has at its front end an upwardly extending portion into which said guide pin of said front bracket enters when said sunroof structure assumes its fully closed position.

4. A sunroof structure as claimed in claim 3, in which said first guide means comprises:
   a guide pin secured to said rear end of said front link; and
   means defining in said front sub-guide a bent slit, said slit including a more inclined front part and a less inclined rear part.

5. A sunroof structure as claimed in claim 4, in which said second guide means comprises:
   first, second and third guide pins secured to said major portion of said rear link; and
   means defining in said rear guide first, second and third guide tracks along which said first, second and third guide pins slide respectively.

6. A sunroof structure as claimed in claim 5, in which said first guide track is defined by a guide groove formed in said rear guide, said guide groove including an inclined front part and a horizontal rear small part, in which said second guide track is defined by a horizontal slit formed in said rear guide and in which said third guide track is defined by a cam surface formed on said rear guide.

7. A sunroof structure as claimed in claim 3, further comprising:
   a rear drain member;
   a shoe slidably engaged with said guide rail at a position behind said rear guide, said shoe adapted to carry thereon said rear drain member; and
   two connecting rods which connect said shoe with said front guide.

8. A sunroof structure as claimed in claim 7, in which said two connecting rods slidably pass through respective guide bores formed in said rear guide device.

9. A sunroof structure as claimed in claim 8, further comprising:
   a deflector pivotally arranged at a front end of said sunroof aperture;
   a link mechanism including a base secured to the front end of said guide rail and a pivotal link pivotally connected to one end of said deflector.

10. A sunroof structure as claimed in claim 1, in which said sunroof lid comprises:
    a substantially rectangular center panel;
    a substantially rectangular metal frame by which said center panel is hemmed; and
    an inner panel connected to a lower surface of said metal frame, said inner panel including a horizontal portion which faces toward said guide rail and an overhang portion which projects inwardly beyond an inner edge of said metal frame.

11. A sunroof structure as claimed in claim 10, in which said overhang portion has a raised leading end equipped with a sealing strip which is resiliently pressed against an inner surface of said center panel.

12. A sunroof structure as claimed in claim 6, in which said rear guide is further formed with a lower step part into which said third guide pin falls from said cam surface when said sunroof lid is tilted up about said guide pin of said front bracket.

* * * * *